United States Patent
Pampus et al.

(10) Patent No.: US 8,823,550 B2
(45) Date of Patent: Sep. 2, 2014

(54) METHOD FOR WARNING A DRIVER OF A COLLISION

(75) Inventors: Christian Pampus, Leonberg (DE); Marcus Schneider, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 13/134,933

(22) Filed: Jun. 21, 2011

(65) Prior Publication Data
US 2012/0013485 A1    Jan. 19, 2012

(30) Foreign Application Priority Data
Jun. 24, 2010  (DE) .................... 10 2010 030 466

(51) Int. Cl.
| G08G 1/00 | (2006.01) |
| B60Q 1/34 | (2006.01) |
| B60Q 1/00 | (2006.01) |
| G05B 23/02 | (2006.01) |
| G08G 1/16 | (2006.01) |
| A01B 69/00 | (2006.01) |
| B62D 15/02 | (2006.01) |
| B60W 50/14 | (2012.01) |
| B60Q 9/00 | (2006.01) |
| B60W 30/095 | (2012.01) |
| B60W 30/06 | (2006.01) |

(52) U.S. Cl.
CPC .............. *B60Q 9/006* (2013.01); *B62D 15/029* (2013.01); *B60W 2550/308* (2013.01); *B60W 30/0953* (2013.01); *B60W 30/06* (2013.01); *B62D 15/027* (2013.01); *B60W 50/14* (2013.01); *B60W 2550/10* (2013.01); *B60Q 9/007* (2013.01)

USPC ....... 340/932.2; 340/436; 340/435; 340/3.41; 340/903; 340/901; 340/457.3; 701/41

(58) Field of Classification Search
CPC ......... G08G 1/16; G08G 1/168; G08G 1/142; B60W 50/14; B60W 2050/143; B60R 21/0134
USPC ............ 340/932.2, 436, 435, 3.41, 903, 901, 340/457.3; 701/41
See application file for complete search history.

(56) References Cited

U.S. PATENT DOCUMENTS

| 4,288,777 A | 9/1981 | Luik | |
| 5,574,426 A | 11/1996 | Shisgal et al. | |
| 6,133,826 A * | 10/2000 | Sparling | ........................ 340/436 |
| 6,268,803 B1 * | 7/2001 | Gunderson et al. | ........... 340/903 |
| 6,542,085 B1 * | 4/2003 | Yang | .............................. 340/903 |

(Continued)

FOREIGN PATENT DOCUMENTS

| DE | 103 24 188 | 12/2004 |
| DE | 10 2007 027 495 | 12/2008 |
| DE | 10 2008 028 763 | 12/2009 |

(Continued)

*Primary Examiner* — George Bugg
*Assistant Examiner* — Munear Akki
(74) *Attorney, Agent, or Firm* — Kenyon & Kenyon LLP

(57) ABSTRACT

In a method for warning a driver of a vehicle about a collision with an object in the course a parking operation, the distance of the vehicle to at least one object in the environment of the vehicle is detected, and if a specified minimum distance is undershot, the driver is warned to stop the vehicle or the vehicle is stopped automatically. The specified minimum distance is varied as a function of the type of parking space and the executed parking maneuver.

11 Claims, 2 Drawing Sheets

(56) References Cited

U.S. PATENT DOCUMENTS

| | | |
|---|---|---|
| 2002/0011928 A1 | 1/2002 | Williams |
| 2002/0041239 A1* | 4/2002 | Shimizu et al. ............ 340/932.2 |
| 2007/0091625 A1 | 4/2007 | Kim |
| 2010/0271238 A1 | 10/2010 | Reed et al. |
| 2011/0093168 A1* | 4/2011 | Barth et al. .................... 701/41 |
| 2011/0288727 A1* | 11/2011 | Krautter et al. ................ 701/41 |
| 2012/0191337 A1* | 7/2012 | Schoenherr et al. .......... 701/400 |

FOREIGN PATENT DOCUMENTS

| | | |
|---|---|---|
| DE | 10 2008 044 073 | 5/2010 |
| GB | 2470265 | 11/2010 |
| JP | 2007-237857 | 9/2007 |
| WO | WO 02/06852 | 1/2002 |

* cited by examiner

METHOD FOR WARNING A DRIVER OF A COLLISION

BACKGROUND OF THE INVENTION

1. Field of the Invention

The present invention relates to a method for warning a driver of a vehicle of a collision with an object, e.g., during parking.

2. Description of Related Art

Methods that warn a driver of a vehicle of a collision with an object during the process of parking are already known and commercially available. Such systems are usually referred to as parking assistants or parking aids. In such parking assistance systems, the distance of the vehicle to objects is recorded with the aid of distance sensors, which are positioned in the fender region of the vehicle as a rule. Via a visual and/or an acoustical display, the driver is informed about the distance to objects detected by the distance sensors. In this context it is common, for example, to provide LEDs for the visual display, the number of LEDs increasing with decreasing distance. At the same time, color coding is possible as well. For example, at a large distance the color of the LEDs is green, with decreasing distance it first turns yellow, and at a very small distance, to red. An acoustical display usually takes the form of successive signal tones, the amplitude between two tones decreasing with decreasing distance, and a continuous tone being transmitted if a minimum distance is undershot. At the same time, it is also possible for the tone frequency to vary with decreasing distance.

In addition to such parking assistance systems, which detect only the distance of the vehicle to objects and display it to the driver, there are also systems which support the driver when parking in a parking space. Such a parking assistance system either provides the driver with information about the required steering movements, or the system itself takes control of the steering operation. The driver's task consists only of accelerating the vehicle, maintaining the speed, or braking. In this case as well, the driver is informed about the distance to objects via distance sensors, so that the driver is able to bring the vehicle to a standstill in a timely manner before a collision occurs.

Especially when parking in perpendicular parking spaces, the parking operation is usually performed in several reverse and forward driving moves. If the vehicle is to be parked in the perpendicular parking space by backing into it, then a reverse move takes place to begin with. With this move, the vehicle is normally not pulled into the parking space directly, but instead is driven at an angle in reverse and closely approaches one of the objects delimiting the parking space; usually another vehicle. In the process, the rear of the vehicle to be parked comes close to the objects delimiting the side of the parking space. If the driver does not brake the vehicle in time, a cost-intensive collision of the fender of the vehicle to be parked with the side of an adjacent vehicle will result. In currently used systems for detecting the environment, such as the one described in US Patent Application Publication No. 2007/0091625, the output signals are fixedly set for certain distances. Thus, the driver receives a warning at always the same distance to an object, regardless of the situation in which the driver finds himself.

In particular when the costly collision in the course of perpendicular parking is looming, the warning by the parking assistance system may possibly arrive too late to prevent a collision. In a parking situation involving longitudinal parking, however, a brief and reliable warning is often desired.

For the output of a sufficiently timely warning, systems for automatically controlled parking are known to record the parking situation while driving past the parking space, by measuring it laterally with the aid of ultrasonic, radar or video sensors. The warning instant may therefore be output as a function of a calculated distance between the vehicle and an object, or as a function of the vehicle speed and the distance. The warning is output based on the collision instant, the so-called time-to-impact. However, the precision of the object positions in such a map of the environment measured while in passing may possibly be compromised, because the two-fold standard deviation is usually greater than 25 cm. Therefore, such methods are of limited use. In one alternative variant of such a time-to-impact warning, it is possible to implement the warning solely on the basis of currently acquired measured values and the current vehicle speed. In addition, it is also known to output such a warning when all of a sudden an object is detected which does not exist in the map of the environment and as a consequence most likely involves a moving object that the driver possibly has not seen either. Such a moving object is a pedestrian, for instance. However, these methods are only of limited advantage when maneuvering at slow speeds since a time-to-impact warning at slow speeds is likewise able to provide only a slight time delay in the warning.

BRIEF SUMMARY OF THE INVENTION

In the method according to the present invention for warning a vehicle driver of a collision with an object in the course of parking, in which the distance of the vehicle to objects in the vehicle environment is detected and if a predefined minimum distance is undershot, a signal is output by which the driver is requested to stop the vehicle or by which the vehicle is stopped automatically, the specified minimum distance is varied as a function of the type of parking space and the performed maneuvers.

By varying the predefined minimum distance as a function of the type of parking space and the executed move, the driver is able to receive a timely warning of a collision. For example, using the method according to the present invention, it is possible to specify a larger than minimum distance in a first move when parking in a perpendicular parking space, than is specified in a first move when parking in a longitudinal parking space. Also, when a plurality of successive moves takes place, for example, the distance may be varied with each move. In particular when parking in a perpendicular parking space, this makes it possible, for instance, to reduce the minimum distance at which the stop warning is output with each move.

When parking the vehicle in a perpendicular parking space, especially when backing into a perpendicular parking space, the first move is frequently the backward move. It is advantageous if the first move does not take the vehicle directly into the parking space. This has the special advantage that sufficient distance to adjacent vehicles is maintainable, so that driver and passenger are still able to open the doors far enough to get out of the vehicle. If the first backward move is not employed to enter the parking space directly, the vehicle is usually backed into the parking space at an angle, generally an angle in the range between 30 and 60 degrees, e.g., 45 degrees, until the vehicle is close to one of the objects delimiting the parking space, usually a vehicle. The backward move is usually followed by a forward move, which is followed by another backward move. The final parking position usually is attained by the second backward move. During the first backward move, the rear of the vehicle to be parked normally comes dangerously close to the sides of a vehicle delimiting the parking space. If the driver of the vehicle does not brake early enough, a collision of the fender of the vehicle to be parked with the side of the adjacent vehicle occurs, which normally is very costly. For this reason it is preferred if the specified minimum distance in a first move is greater than in the following moves. This allows the driver to bring the vehicle to a timely standstill before a collision.

In contrast to a collision of the fender of the vehicle to be parked with the side of the adjacent vehicle, a collision of the fender of the vehicle to be parked with a fender of a parked car is much more advantageous since modern vehicles are generally equipped with plastic fenders provided with a resistant coat of paint, so that both vehicles involved in such a fender-to-fender collision will not even sustain noticeable scratches. Because of the low damage arising in a fender-to-fender collision, it is possible to reduce the specified minimum distance in the moves following the first move.

If the perpendicular parking space in which the vehicle is parked is too small to open the doors on both sides of the vehicle, then the minimum distance in a perpendicular parking space in one of the backward moves is preferably selected such that the distance of the vehicle to adjacent objects at the end of the parking operation is still large enough to allow at least the doors on the driver side to be opened, so that the driver is able to get out of the car.

In order to make a choice as to whether a relatively large minimum distance is to be specified in the first driving move or whether a low minimum distance will suffice, it is advantageous to record the type of parking space prior to starting the parking operation. For example, if a perpendicular parking space is recorded, it is advantageous to choose a large minimum distance, whereas in the case of a longitudinal parking space, a small minimum distance is able to be selected even for the first move.

To detect the type of parking space, it is advantageous to analyze contours of the objects delimiting the parking space. For instance, parking spaces having a length of less than 3.5 meters are interpreted as perpendicular parking space. Whether a parking space is suitable as longitudinal parking space is generally dependent on the length of the vehicle. As a rule, a parking space is suitable as longitudinal parking space only if the length of the parking space corresponds to the vehicle length plus 1.5 m. In addition to the length of the parking space, which is measured in passing, the depth of the parking space may additionally be recorded for detecting the type of parking space, provided suitable sensors are available. If the parking space has little depth, it is assumed that it is a longitudinal parking space; if the length of the parking space corresponds at least to the length of the vehicle, then this usually indicates a perpendicular parking space. Accordingly, it is also possible to detect diagonal parking spaces, such a diagonal parking space being identified in particular if the distance to an object delimiting the parking space increases or decreases continuously while passing it.

In addition to detecting the parking space by utilizing a parking space measuring system, it is also possible to record the type of parking space by analyzing the changes in the vehicle orientation during maneuvering.

Toward this end steering wheel angles, data acquired by wheel travel sensors, or the ESP yaw rate, for example, may be analyzed.

If the type of parking space is detected with the aid of a parking space measuring system, then optical sensors such as stereo video, ultrasonic sensors, LIDAR sensors, radar sensors or infrared sensors may be employed. Especially in cases where the depth of a parking space is to be detected as well, sensors that are capable of detecting the required large distance must be used. Especially suitable for this purpose are stereo video or radar sensors.

In one specific embodiment of the present invention, the type of parking space is inferred at the start of the parking operation on the basis of vehicle signals. As a matter of principle, the parking situation, i.e., especially which move is executed just then, is basically known or determined on the basis of instantaneously ascertained vehicle signals. In a system featuring automatic steering, the maneuvering move is known as a matter of principle. Vehicle signals that are able to be analyzed in order to determine the parking situation are, for example, the steering wheel angle, the gear lever position, the vehicle speed, and the yaw rate. The yaw rate results from the driving direction and the steering wheel angle. It is possible, for example, to estimate the angle at which the vehicle will rotate within the distance traveled next.

By detecting the type of parking space, e.g., a longitudinal parking space, a perpendicular parking space or a diagonal parking space and the parking situation, that is, whether, for example, a backward move with a collision direction toward the side of a parking space delimitation is taking place or a backward move with a collision direction parallel to the driving direction of the vehicle, the warning behavior is able to be adapted. For example, the signal for the immediate stopping of the vehicle in the first backward move into a perpendicular parking space may be output earlier, such as 10 to 50 cm earlier, preferably 20 cm earlier, so that the collision risk is reduced and the driver is not given the impression of being led into a dangerous situation. In the following backward moves when parking in a perpendicular parking space, the warning can then be output only 5 to 30 cm, e.g., 10 cm earlier, than usual. This indicates to the driver that he is coming so close to the vehicles that he will be unable to open the vehicle door, yet does not give him a stop warning immediately, which might otherwise induce him to terminate the parking operation. As soon as the vehicle is brought into parallel alignment to the vehicles delimiting the parking spaces from the side, the warning for the immediate stopping of the vehicle is able to be output at the minimum distance typical of the system.

The present invention also includes a device for implementing the method, which includes means for measuring a parking space, and a control device for outputting a request to the driver to stop the vehicle, or for stopping the vehicle automatically as soon as a minimum distance specified in the control device is undershot; the control device includes program code by which the predefined minimum distance is varied as a function of the type of parking space and the executed maneuver.

DETAILED DESCRIPTION OF THE INVENTION

Figure 1:
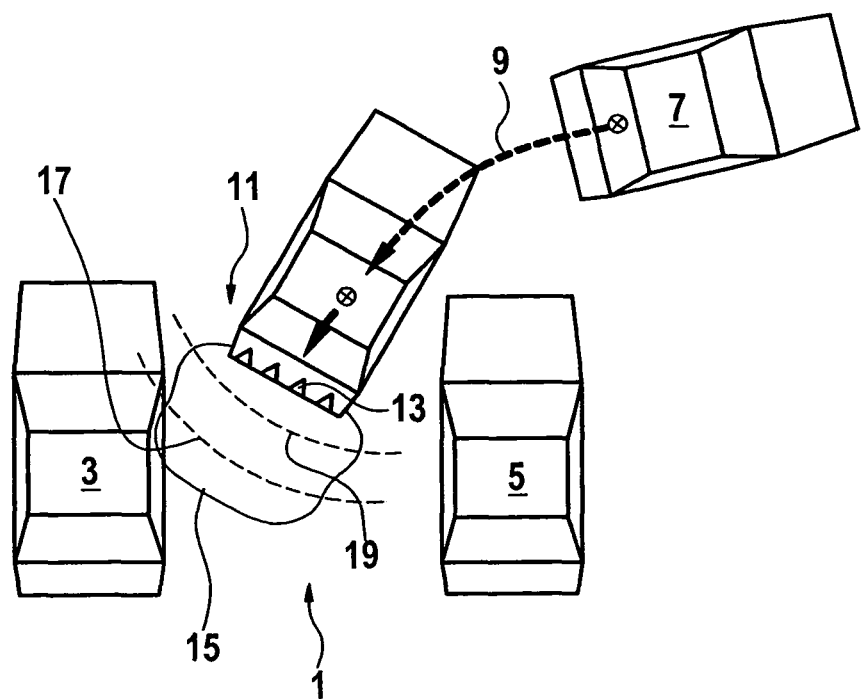
FIG. 1 shows a parking operation in a perpendicular parking space.

FIG. 1 schematically illustrates a parking operation in a perpendicular parking space.

A perpendicular parking space 1 is frequently delimited along its sides. For example, as illustrated here, the delimitation is by a first vehicle 3 and a second vehicle 5. In addition to the delimitation by vehicles 3, 5, however, it is also possible that a perpendicular parking space is delimitated by a wall or plants at least on one side. A delimitation by walls is encountered in a garage, for instance.

Parking in a perpendicular parking space 1 may be carried out by driving forward or in reverse. If parking in perpendicular space 1 is executed by backing up, then a vehicle 7 to be parked first executes a backup move 9 into the parking space. Backup move 9 is usually performed in such a way that the vehicle drives up to one of vehicles 3, 5 delimiting perpendicular parking space 1 at an angle. In the specific embodiment shown here, vehicle 7 to be parked drives toward first vehicle 3 by backup move 9.

In order to warn the driver of a potential collision with first vehicle 3, vehicle 7 to be parked has distance sensors 13 in rear region 11. Distance sensors 13 detect the distance to objects in detection region 15 of distance sensors 13.

Ultrasonic sensors and/or infrared sensors, radar sensors or LIDAR sensors, for example, are used as distance sensors 13. The sensors usually transmit a signal to detect the distance to an object. If an object is situated within detection range 15 of distance sensors 13, then the signal is reflected at the object. The reflected signal is then received by the sensor. The distance to the object is calculated from the propagation time of the signal from transmission to reception.

In order to inform the driver of vehicle 7 to be parked about the distance to an object, the distance is indicated to the driver visually and/or acoustically. For the visual display, for example, it is possible to provide a plurality of LEDs aligned in a row, the number of the LEDs illuminated increasing as the distance decreases. For the acoustic indication, it is common to output repeating warning tones. The pauses between the individual warning tones become shorter with decreasing distance to the detected object. In a drop below a specified minimum distance, a continuous warning tone is output. For example, it is possible that warning tones with a long pause between them are transmitted up to a first distance 17, warning tones with a shorter interval are output between first distance 17 and a second distance 19, and a continuous warning tone is output starting at second distance 19. This means that a permanent tone is heard as soon as the distance between vehicle 7 to be parked and vehicle 3 reaches second distance 19, and the driver is thus alerted to stop the vehicle. In conventional systems as used by the related art, second distance 19 at which the stop warning is output, e.g., the continuous tone, is fixedly set. Especially when approaching an object at an angle, as shown in FIG. 1, for example, and when parking in a perpendicular parking space using the first backup move, this second distance 19 may be too small in the driver's subjective understanding. For this reason, the present invention selects a second distance 19 for a first backup move into a perpendicular parking space that is larger than that specified by the systems known from the related art.

The parking in a perpendicular parking space by an initial backup move, which ends at an angle, i.e., at an angle to adjacent vehicles 3, 5, also allows parking in a parking space that does not allow direct parking via a backward move due to the limited steering-wheel angle. Furthermore, in a multi-stage approach, i.e., when parking requires several moves, vehicle 7 to be parked requires less maneuvering space and need not swing out into the oncoming traffic lane to such a great extent. This provides advantages, especially given potential oncoming traffic, and furthermore also in a parking garage where very limited room exists for maneuvering.

Figure 2:
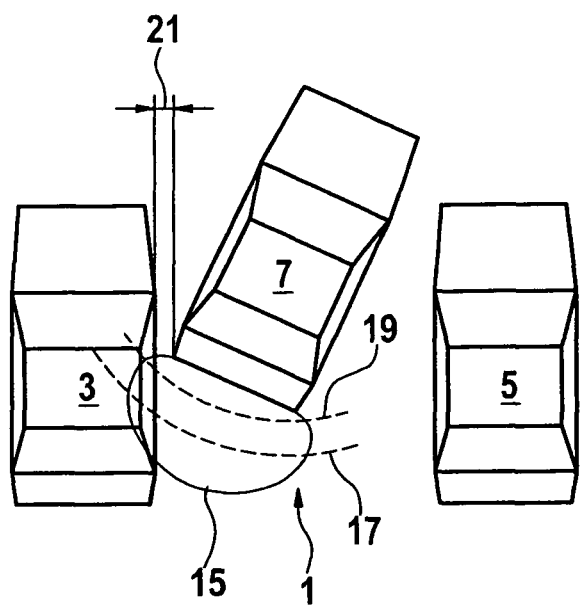
FIG. 2 shows a parking operation in a perpendicular parking space, the stop warning being based on a small distance.

A parking operation in a perpendicular parking space at a low specified minimum distance for a stop warning is shown in FIG. 2.

Figure 3:
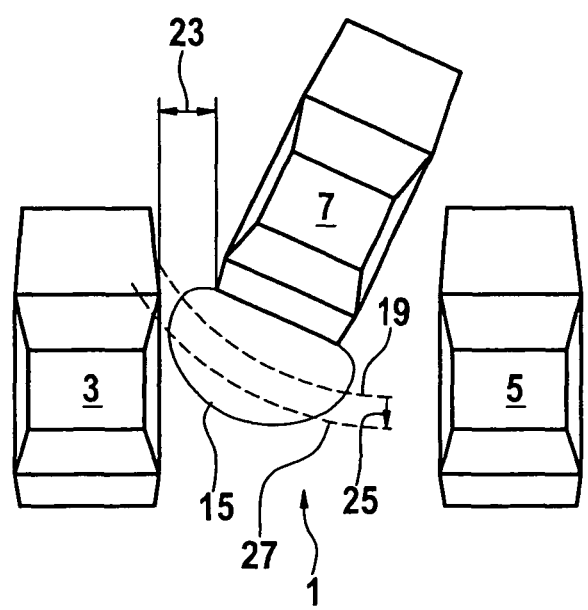
FIG. 3 shows a parking operation in a perpendicular parking space, the stop warning being based on a large distance.

At a very low second distance 19, i.e., at a specified low minimum distance for emitting the stop signal, the rear edge of the vehicle is already very close to first vehicle 3 delimiting perpendicular parking space 1. This small distance 21 to first vehicle 3, which has already been reached by the time the stop warning is output, may seem too low to the driver, especially in view of the damage amount that is at stake in case of a collision with the side of a vehicle. As a result, the driver may lose trust in the parking assistance system. Therefore, a larger distance 23 to first vehicle 3 at which the stop warning is heard is selected for the first backup move into a perpendicular parking space. In this way the driver is able to feel subjectively more secure, so that he does not lose trust in the parking assistance system. Larger distance 23 to the first vehicle is shown in FIG. 3 by way of example. To enlarge distance 23, the minimum distance at which the stop warning is heard, to second distance 19 is increased by a specified amount 25. A new minimum distance 27 results from this distance increase 25. New minimum distance 27 is selected such that a sufficiently large distance 23 to first vehicle 3 prevails when the stop warning is heard. Distance increase 25 by which second distance 19 is increased, i.e., by which the originally specified minimum distance is increased to form new minimum distance 27, preferably lies in a range from 10 to 50 cm, especially 15 to 25 cm, e.g., 20 cm.

In order to obtain sufficient distance between vehicle 3, which delimits perpendicular parking space 1 along the side, and vehicle 7 to be parked, so that the driver is still able to open the door and exit after reaching the parked position, it is furthermore preferred if the minimum distance in subsequent backward moves continues to be selected larger than second distance 19. However, a smaller distance than new minimum distance 27 set during the first backward move is sufficient. The minimum distance of the subsequent backward moves may be increased by 5 to 30 cm, for instance, especially 7 to 15 cm, e.g., 10 cm, in comparison with original minimum distance 19. This is generally adequate to obtain sufficient distance between vehicle 7 to be parked and already stationary vehicle 3 once the vehicle has reached its parked position.

To determine a meaningful distance increase 25 for the first backward move, it is also advantageous if prior to the actual parking operation a determination is made as to the type of parking space in which vehicle 7 is to be parked. It is particularly important to detect whether the parking operation relates to a perpendicular parking space, a longitudinal parking space, or a diagonal parking space. When parking in a longitudinal parking space, the specified minimum distance at which the stop warning is heard may usually remain at the setting specified by the system. If the vehicle is to park in a perpendicular parking space, it is advantageous to enlarge the specified minimum distance to new minimum distance 27 for the first backward move.

The detection as to what type of parking space is involved may be accomplished by measuring the parking space while the vehicle is driving past it. Sensors, which are capable of recording the contour of the parking space, are provided for this purpose, usually in the front region of the vehicle. To detect the type of parking space, in particular, contours of objects delimiting the parking space are analyzed. For example, the distance between the two objects delimiting the parking space allows an inference as to whether a longitudinal parking space or a perpendicular parking space is involved. The depth of the parking space may be detected in addition. Low depth and great length usually indicates a longitudinal parking space, whereas a smaller length such as less than 3.5 m, and greater depth, which generally exceeds the vehicle length, usually denotes a perpendicular parking space. In addition or alternatively, the type of parking space is also inferable on the basis of vehicle signals at the beginning of the parking maneuver. For example, when parking in a longitudinal parking space, the steering wheel angle differs from the steering wheel angle used for parking in a perpendicular parking space. In addition to the steering wheel position, i.e., the steering wheel angle, the selected gear, the vehicle speed, and/or the degree of rotation of the vehicle may be analyzed in order to infer the type of parking space. The modification of the minimum distance in the first backward move, which is a function of the type of parking space, merely requires that the type of parking space is detected during the first backward move. A readjustment of the minimum distance must be made only shortly before reaching the final minimum distance.

If the minimum distance at which the stop warning is output is increased for the first backward move, then it is also advantageous if the original specification is reset again as soon as parking has been completed or even after the first backward move has been completed. However, when backing into a perpendicular parking space, it is advantageous to reset the original settings only after parking has been completed.

What is claimed is:

1. A method for assisting a driver of a vehicle to avoid a potential collision with an object in the course of a parking operation of the vehicle into a parking space, comprising:
   measuring the distance of the vehicle to at least one object in the environment of the vehicle;
   determining whether the measured distance of the vehicle to the at least one object is less than a specified minimum distance, wherein the specified minimum distance is varied as a function of a type of parking space and an executed parking maneuver; and
   if the measured distance of the vehicle to the at least one object is less than the specified minimum distance, one of i) outputting a warning to the driver to stop the vehicle, or ii) automatically stopping the vehicle;
   wherein the specified minimum distance during a first parking maneuver of the parking operation is greater than the specified minimum distance during subsequent parking maneuvers of the parking operation.

2. The method as recited in claim 1, wherein the first parking maneuver during parking in a perpendicular parking space is a backward move.

3. The method as recited in claim 2, wherein the minimum distance for subsequent backward moves during parking in a perpendicular parking space is selected such that at the end of the parking operation the distance of the vehicle to adjacent objects is large enough to allow doors situated on the driver side of the vehicle to be opened.

4. The method as recited in claim 1, wherein the type of parking space is detected prior to the first parking maneuver of the parking operation.

5. The method as recited in claim 4, wherein contours of objects delimiting the parking space are analyzed in order to detect the type of parking space.

6. The method as recited in claim 4, wherein a parking space is detected as a perpendicular parking space when the distance between two objects delimiting an opening of the parking space is less than a predefined minimum threshold distance.

7. The method as recited in claim 1, wherein the type of parking space is inferred on the basis of at least one vehicle operating parameter at the start of the parking operation.

8. The method as recited in claim 7, wherein at least one of steering wheel angle, selected gear, vehicle speed, and yaw rate of the vehicle is evaluated as the at least one vehicle operating parameter.

9. The method as recited in claim 8, wherein the specified minimum distance for parking in a longitudinal parking space is smaller than the specified minimum distance for parking in a perpendicular parking space.

10. A device for assisting a driver of a vehicle to avoid a potential collision with an object in the course of a parking operation of the vehicle into a parking space, comprising:
    a measuring unit configured to measure the distance of the vehicle to at least one object in the environment of the vehicle; and
    a control unit configured to:
      determine whether the measured distance of the vehicle to the at least one object is less than a specified minimum distance, wherein the specified minimum distance is varied as a function of a type of parking space and an executed parking maneuver; and
      if the measured distance of the vehicle to the at least one object is less than the specified minimum distance, one of i) output a warning to the driver to stop the vehicle, or ii) automatically stop the vehicle;
    wherein the specified minimum distance during a first parking maneuver of the parking operation is greater than the specified minimum distance during subsequent parking maneuvers of the parking operation.

11. The device as recited in claim 10, wherein the measuring unit includes one of optical sensors, ultrasonic sensors, LIDAR sensors, radar sensors or infrared sensors.

* * * * *